US006654955B1

United States Patent
Kusnitz et al.

(10) Patent No.: US 6,654,955 B1
(45) Date of Patent: *Nov. 25, 2003

(54) ADDING SPEECH RECOGNITION LIBRARIES TO AN EXISTING PROGRAM AT RUNTIME

(75) Inventors: Jeffrey Alan Kusnitz, Monroe, CT (US); John Anthony Moore, Pacifica, CA (US); Marc Segre, Round Rock, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1222 days.

(21) Appl. No.: 08/772,047

(22) Filed: Dec. 19, 1996

(51) Int. Cl.⁷ ................................................. G06F 9/44
(52) U.S. Cl. ........................ 717/163; 704/231; 704/275
(58) Field of Search ................................ 704/231, 271, 704/275; 345/156

(56) References Cited

U.S. PATENT DOCUMENTS

| | | | |
|---|---|---|---|
| 4,573,187 A | | 2/1986 | Bui et al. |
| 4,677,569 A | | 6/1987 | Nakano et al. |
| 4,766,529 A | | 8/1988 | Nakano et al. |
| 4,776,016 A | * | 10/1988 | Hansen ........................ 704/275 |
| 4,858,170 A | | 8/1989 | DeWick, Sr. et al. |
| 4,910,784 A | | 3/1990 | Doddington et al. |
| 5,157,384 A | * | 10/1992 | Greanias et al. ............ 340/706 |
| 5,179,700 A | * | 1/1993 | Aihara et al. ............... 395/650 |
| 5,252,951 A | * | 10/1993 | Tannenbaum et al. ....... 345/156 |
| 5,260,697 A | * | 11/1993 | Barrett et al. ............... 345/173 |
| 5,408,582 A | | 4/1995 | Colier |
| 5,425,128 A | | 6/1995 | Morrison |
| 5,442,376 A | * | 8/1995 | Tannenbaum et al. ....... 345/156 |
| 5,500,920 A | | 3/1996 | Kupiec |
| 5,526,407 A | * | 6/1996 | Russell et al. ................. 379/89 |
| 5,530,863 A | | 6/1996 | Hino |
| 5,555,365 A | * | 9/1996 | Selby et al. ................ 395/159 |
| 5,566,248 A | * | 10/1996 | Ulrich ........................ 382/187 |
| 5,632,002 A | * | 5/1997 | Hashimoto et al. .......... 395/2.4 |
| 5,651,094 A | * | 7/1997 | Takagi et al. .............. 395/2.53 |
| 5,659,665 A | * | 8/1997 | Whelpley, Jr. .............. 704/275 |
| 5,664,061 A | * | 9/1997 | Andreshak et al. ......... 704/275 |

OTHER PUBLICATIONS

Emiliani, Pier. IEEE Colloq. (1993) No. 103: Information Access for People. 11/1–11.3, 1993.*
McKiel, Frank. Audio enabled graphical user interface for the blind or visually impaired. Computer Applications to Assist Persons with Disabilities, 1992 Proceedings. 1992.*
Huang et al. "Microsoft Windows Highly intelligent speech recognizer: WHISPER." Acoustics, Speech and Signal Processing. 1995.*
Schmandt et al. "Augmenting a window system with speech input." Computer Magazine. 1990.*
Object–Orientewd DLLs Gen Kiyooka Beyond DOS, Dec. 1992.*
Object Oriented Analysis and Design with Applications, Grady Booch pp. 474–475, Sep. 1993.*
A Gentle Introduction to the VAX system, J.R. Hubbard pp. 117–118, 1987.*
Object–Oriented Software Construction, Bertrand Meyer pp. 339–444, Apr. 4, 1996.*
Microsoft Windows 95 Resource Kit, Microsoft Press pp. 1017–1037, Aug. 19, 1995.*
The Computer Speech Book Esther Schindler Chapters 2, 6,8,10,12,13, Feb. 1996.*

* cited by examiner

Primary Examiner—T. D. Ingberg
(74) Attorney, Agent, or Firm—David A. Mims, Jr.

(57) ABSTRACT

A method and apparatus for enabling existing application programs for operation in speech recognition environments. Existing applications programs written with a dynamically linked library or object library, with no speech recognition capability, are capable of accepting input from a speech recognition without modification. An alternate dynamic library or object library is provided that supports the same interface or objects used by the original program. The alternate library is written so that it is aware of and receives input from the speech recognition system. The alternate library passes the input to the application program using the existing interfaces.

12 Claims, 5 Drawing Sheets

ADDING SPEECH RECOGNITION LIBRARIES TO AN EXISTING PROGRAM AT RUNTIME

FIELD OF THE INVENTION

The present invention relates to data processing systems, and more particularly, to enabling existing application programs for operation in speech recognition environments.

BACKGROUND OF THE INVENTION

Computer users have always yelled at their machines, but now computers are beginning to listen. The tap-tap-tap of the electronic workplace is being joined by a cacophony of conversation. Users can tell their computers to open and close files or perform other tasks by speaking a few words. Telephone callers can tell their carriers' computer systems to make a collect call or dial a business associate or suppliers.

Driving this move to listening computers is a one thousand per cent increase in microprocessor power, an accompanying price drop, and a new generation of voice-recognition devices. Another force bringing the power of voice to the desktop is the need to find an alternative input device for the keyboard and mouse. A logical replacement is a voice interface which allows a user to use a device available since birth. Speech recognition technology is available to the desktop user through the simple installation of a program and a microphone.

Typical prior art speech recognition operations occur in a single user, speech-dependent environment. This requires each speaker to train the speech recognizer with the user's voice patterns, during a process called "enrollment". The system then maintains a profile for each speaker, who must identify themselves to the system in future recognition sessions. Typically speakers enroll via a local microphone in a low noise environment, speaking to the single machine on which the recognizer is resident. During the course of enrollment, the speaker is required to read a lengthy set of transcripts, so that the system can adjust itself to the peculiarities of each particular speaker. These systems require speakers to form each word in a halting and unnatural manner, pausing, between, each, and, every, word. This allows the speech recognizer to identify the voice pattern associated with each individual word using preceding, and following, silences to bound the words. The speech recognizer will typically have a single application for which it is trained.

More recently, a major advance occurred with the advent of speaker independent recognition systems that are capable of recognizing words from a continuous stream of conversational speech. This system requires no individualized speaker enrollment for effective use, unlike some speaker dependent systems which require speakers to be re-enrolled every four to six weeks, or require users carry a personalized plug-in cartridge to be understood by the system. With continuous speech recognition, no pauses between words are required, thus providing a more user friendly approach to the causal user of a speech recognition system. The growing familiarity and acceptance of speech has lead to more demand for speech aware applications. While applications have started to be designed for speech input, a large number of application programs have been written before this user friendly approach was available.

Consequently, it would be desirable to automatically enable existing application programs for operation in speech recognition environments without changing existing source code or recompiling the application programs.

SUMMARY OF THE INVENTION

This invention relates to a method and apparatus for enabling existing application programs for operation in speech recognition environments. Existing application programs written with a dynamically linked library or object library, with no speech recognition capability, are capable of accepting input from a speech recognition device without modification. This is accomplished by supplying an alternate dynamic library or object library that supports the same interface or objects used by the original program. The alternate library is written so that it is aware of and receives input from the speech recognition system. The alternate library then passes the input to the application program using the existing interfaces. The application program is unaware that the input comes from the speech recognition system instead of standard input devices such as keyboards or mouses.

DETAILED DESCRIPTION OF THE EMBODIMENTS

This invention provides a method and apparatus for providing existing application programs written with dynamically linked libraries or objects with speech recognition capabilities without changing existing source code or recompiling. This is accomplished by providing an alternate dynamic library or object library that supports the same interface or objects used by the application program. Application programs implementing the Motif widget library, available from the IBM Corporation, and Open Class libraries using C-Set are examples of libraries capable of utilizing this invention. The alternate speech enabled dynamic libraries or objects are loaded and dynamically linked at runtime, replacing the existing non-speech libraries/objects. The invention will now be explained in further detail using FIGS. 1–6.

Figure 1:
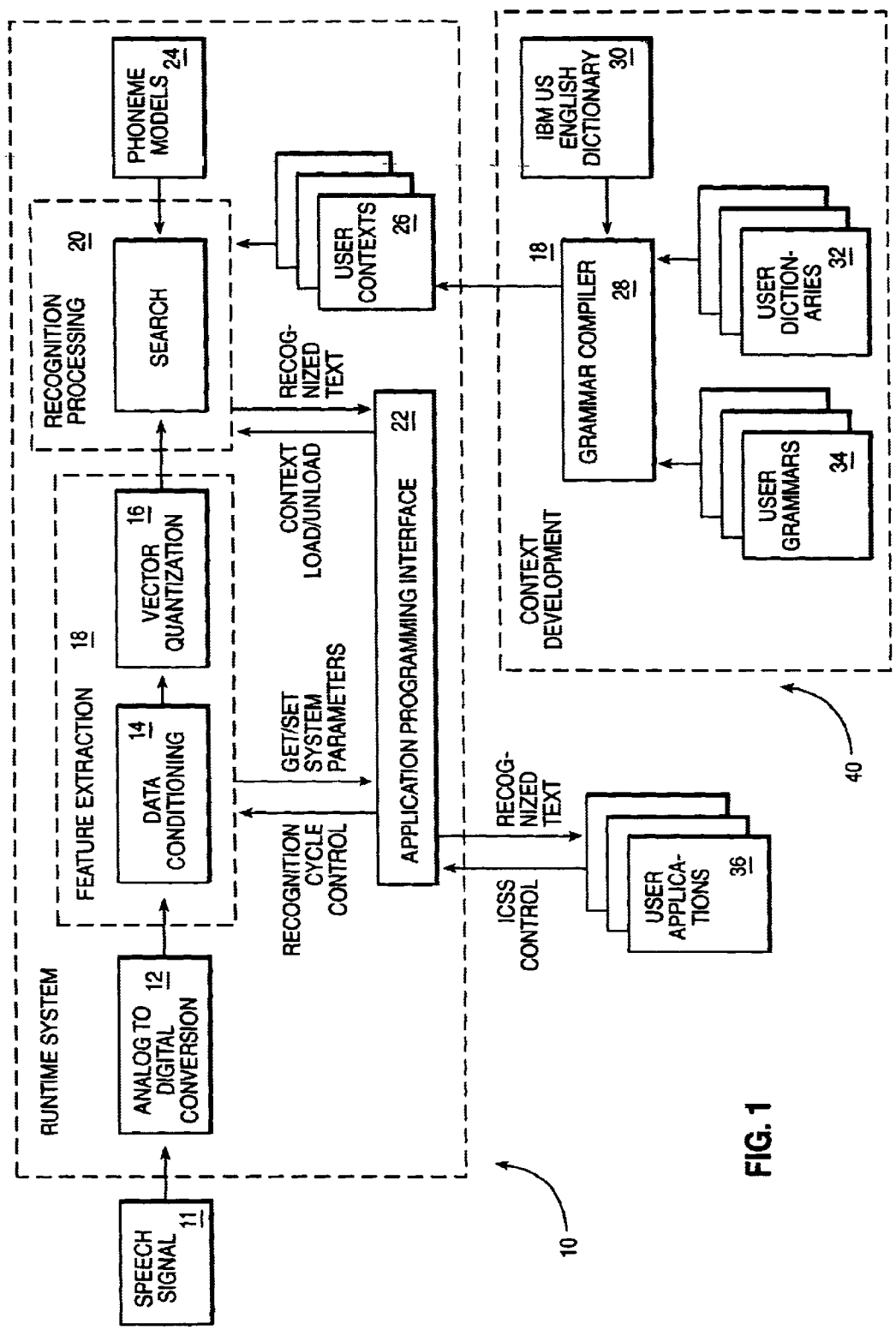
FIG. 1 is an illustrative embodiment of a speech recognition engine where the invention may be practiced.

Referring now to FIG. 1, there is shown a pictorial representation of a logical architecture for a speech recognition engine 10, where the invention may be practiced. The speech recognition engine 10 consists of a component for receiving a speech signal 11, from a microphone or other speech input device, which is subjected to analog to digital 12 conversion. An audio adapter and its associated software driver are required for the analog to digital conversion in a manner well known in the art. Feature extraction 18, consisting of data conditioning 14 and vector quantization 16, is carried out on the received digital speech data. During feature extraction 18 the speech data is compressed, and the data conditioning component 14 converts the speech data samples into the appropriate format for use in the speech recognition engine 10. The vector quantization component 16 reduces the speech data samples into frames, which provide enough information to allow the speech engine to recognize the speech. After feature extraction 18 is completed, recognition processing 20 occurs by a process called a beam search. Beam searching functions to find the highest probability sequence of words given the acoustic input (i.e., digitized speech from the microphone). Beam searching is carried out using a graph search technique and Hidden Markov Models. As sounds are processed, unlikely sounds are eliminated or pruned. The process continues until an entire utterance is recognized which is returned as recognized text to the application programming interface (API) 22 and user applications 36. The distinct sounds used in speaking a language are called phonemes. These phonemes are similar to markings in a dictionary that explain pronunciation. The phonemes for a particular language (i.e., English) are represented as a series of phonemes in an acoustic model as phoneme models 24.

User contexts 26 limits the words that will be considered at one time during recognition processing 20. The user contexts 26 limit consideration to words appropriate for a user's applications 36. The context development component 40 allows off-line activities required to build the user contexts 26. Grammar files 34 contain the particular words and sequences of words that a user can say. The grammar compiler 28 receives input from a US English dictionary 30, user specific dictionaries 32, and user grammars 34 and compiles them into the user contexts 26. In the preferred embodiment, the user grammar is composed of a sequence of three words called a trigram. The application program interface (API) 22 offers calls to the recognition processing component 20, feature extraction 18 to user applications 36.

Figure 2:
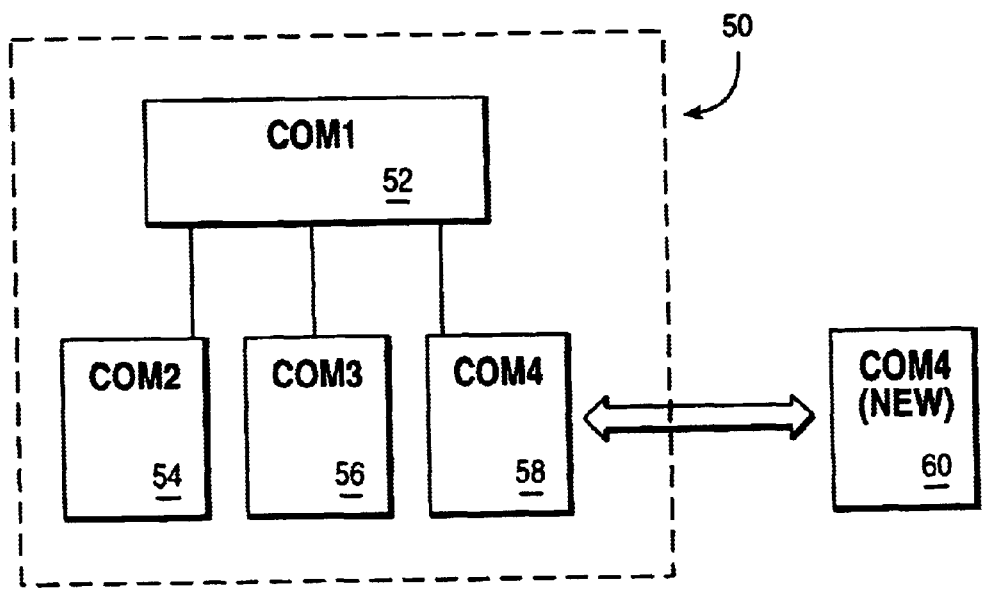
FIG. 2 is a pictorial of an application program having multiple components/libraries that can be dynamically linked at runtime.

Referring now to FIG. 2, there is illustrated a high-level diagram of an application program 50 which may be dynamically linked at runtime. The application program 50 is composed of four components/libraries/objects 52–58. The components 52–58 are loaded and linked at runtime to allow execution of the application program 50. This invention utilizes dynamic linking of the program by providing a new speech enabled component 60 which replaces one of the existing components 58. The new speech enabled component 60 contains input/output controls such as scrolled text menubars, popup menus, list boxes, etc. This invention supplies the speech enabled component 60 which supports the same interface or objects used by the application program 50. The new component is aware of and receives input from the speech recognition system and passes the input to the application program 50 using the existing interfaces of the existing component 58. The application program 50 is unaware that the speech enabled input comes from the speech recognition system instead of a standard input device such as the keyboard or a mouse.

Figure 3:
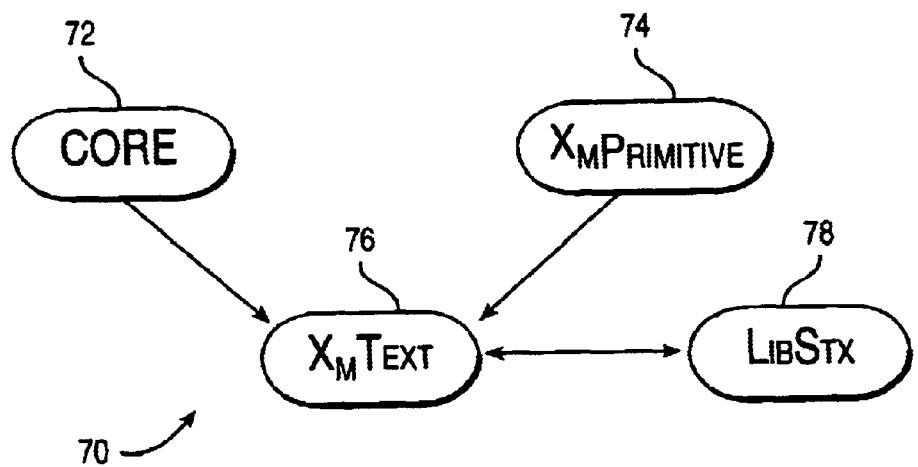
FIG. 3 is an object-type Motif widget containing speech enabling capability.

Referring now to FIG. 3, there is shown an object-oriented type representation 70 of a Motif widget. In the preferred embodiment, encapsulation of the speech functionality is provided using a speech toolkit consisting of a dynamic library, header files and interface modules. The XmText widget 76 class inherits behavior and resource from the Core 72 and XmPrimitive 74 widget classes. In the preferred embodiment, speech functionality is encapsulated in the LibStx object 78 which uses Xt mechanisms to add speech functionality to the Text Widget. The following minor changes must be made to the application program:

1) Di->StInitialize(ad.top.appContext, "textWidget");
2) Di->StAddPulldownMenu(ad.dictationPD, ad.MenuBar);
3) Di->StAddXmText(ad.textWidget,ad.appPopup, NULL);

Line 1 of the above changes provides for the initialization of the speech recognition toolkit (i.e., LibStx). A speech recognition menu in the form of a pull down is then added to the existing menu bar by line 2. Line 3 provides for passing the pointer to the text widget to the speech toolkit. Additional details on speech calls and mechanisms for particular implementations may be found in Chapter 18 of the IBM Ultimedia Services (UMS) for AIX Users Guide and associated readme files shipped with UMS, which are incorporated herein by reference.

Figure 4:
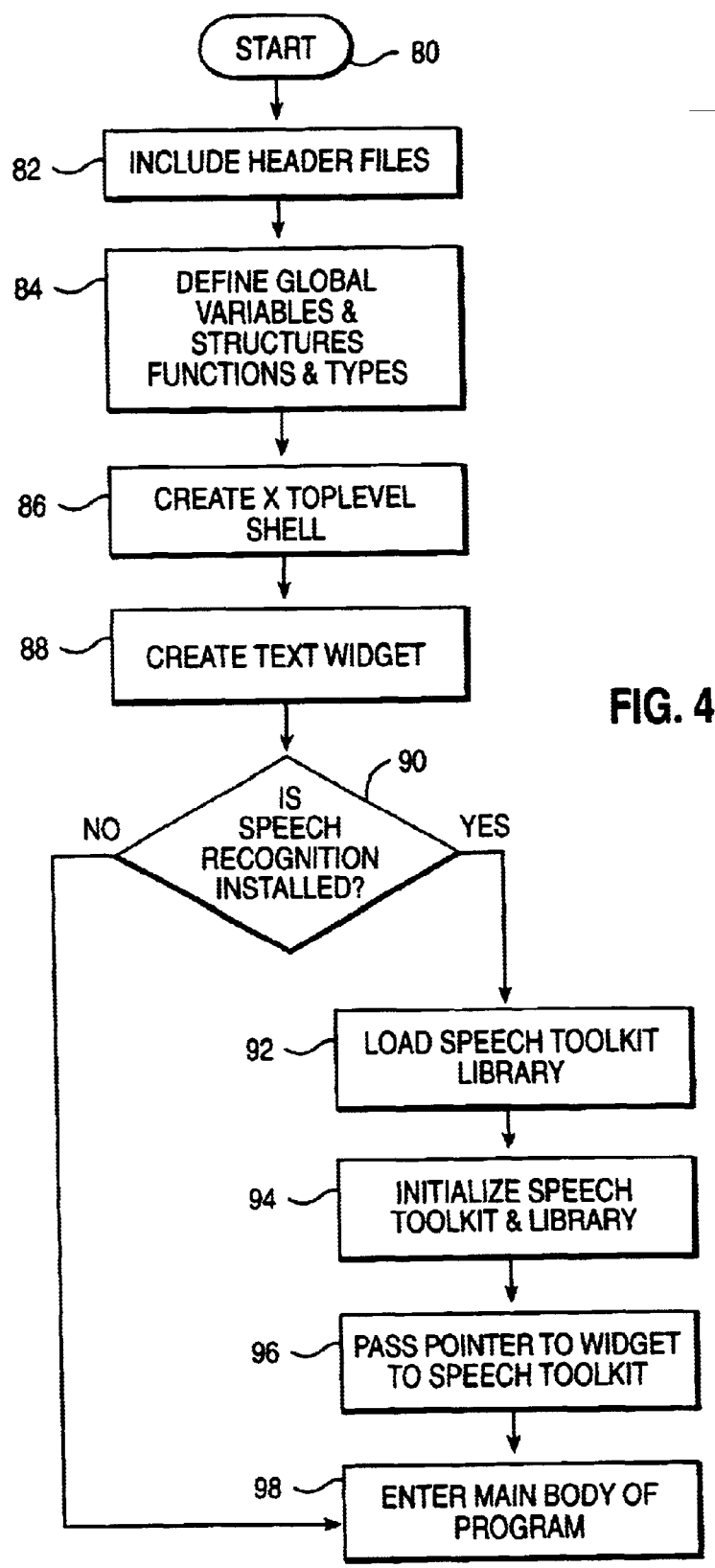
FIG. 4 is a flow diagram for enabling a Motif object-type with speech capability.

Referring now to FIG. 4, there is shown a flow diagram for creation of a speech enabled object. The procedure begins at block 80 and proceeds immediately to block 82 where a header file for dictation is inserted. At block 84, the global variables, structures and functions for dictation are defined. The X toplevel shell is then created as shown in block 86. At block 88, the procedure causes the creation of a text widget. A determination is made at block 90 whether speech recognition is installed. If NO, the procedure enters the main body of the application program as shown in block 98. If YES, at block 92 the speech library is loaded. At block 94, the speech toolkit and library are initialized and a pointer to the text widget is passed to the speech toolkit as shown in block 96. The procedure then enters the main body of the application program as shown in block 98.

Figure 5:
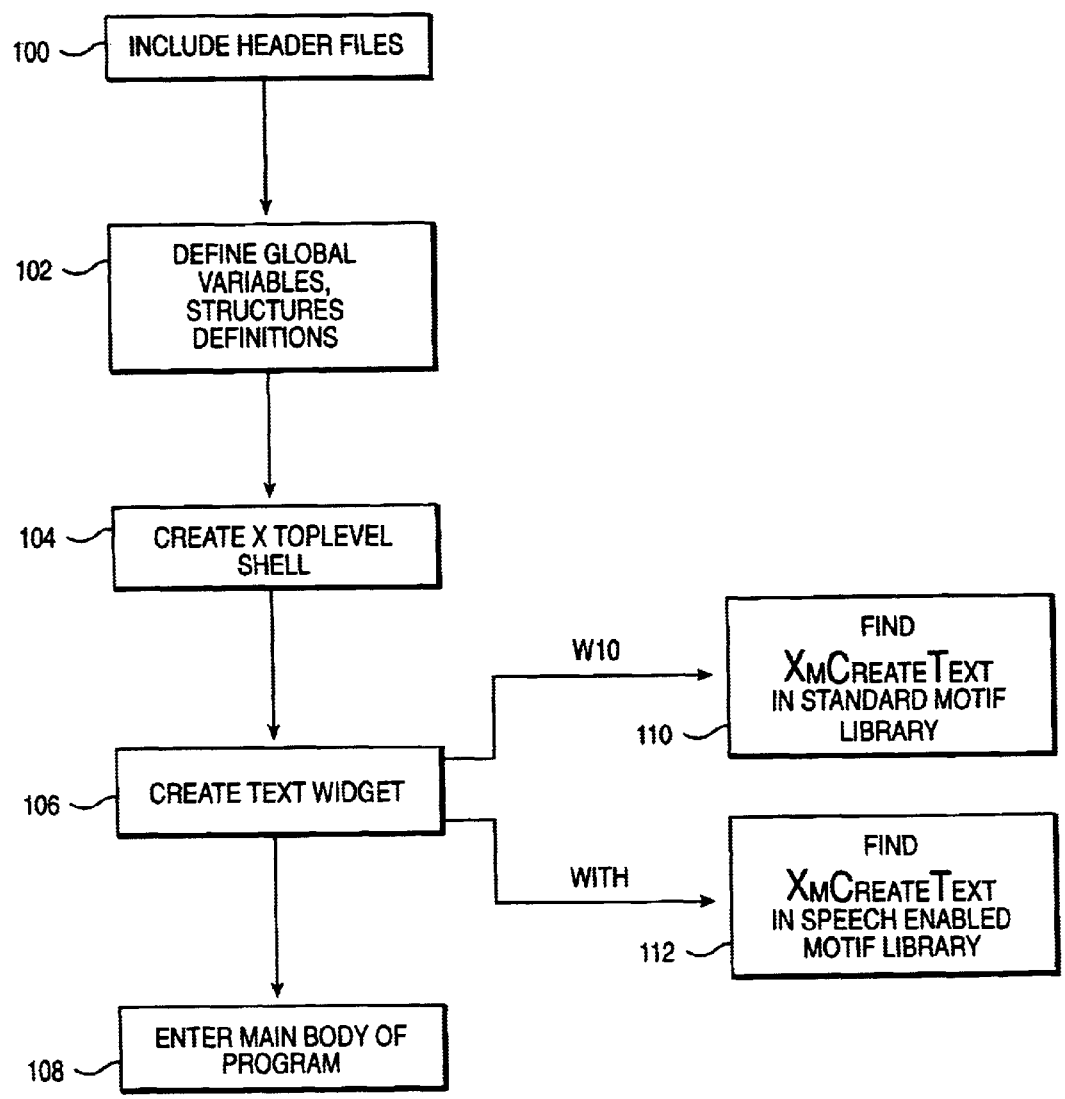
FIG. 5 is a block diagram for providing speech capability for an object environment.

Referring now to FIG. 5, there is shown a block diagram for an alternative embodiment for providing speech enablement capability in an object-oriented environment, which eliminates the need for modifying the existing program. At block 100, the procedure allows the inclusion of header files. The global variables, structures, and definitions are defined as shown in block 102. At block 104, the X Toplevel shell is created and the text widgets are created as shown in block 106. If the speech component is not enabled, the procedure finds XmCreateText in the standard Motif library as shown in block 110. If the speech component is enabled, the procedure finds XmCreateText in the speech enabled Motif library as shown in block 112. After determining from which Motif library to fetch XmCreateText, the procedure enters the main body of the application program as shown in block 108.

Figure 6:
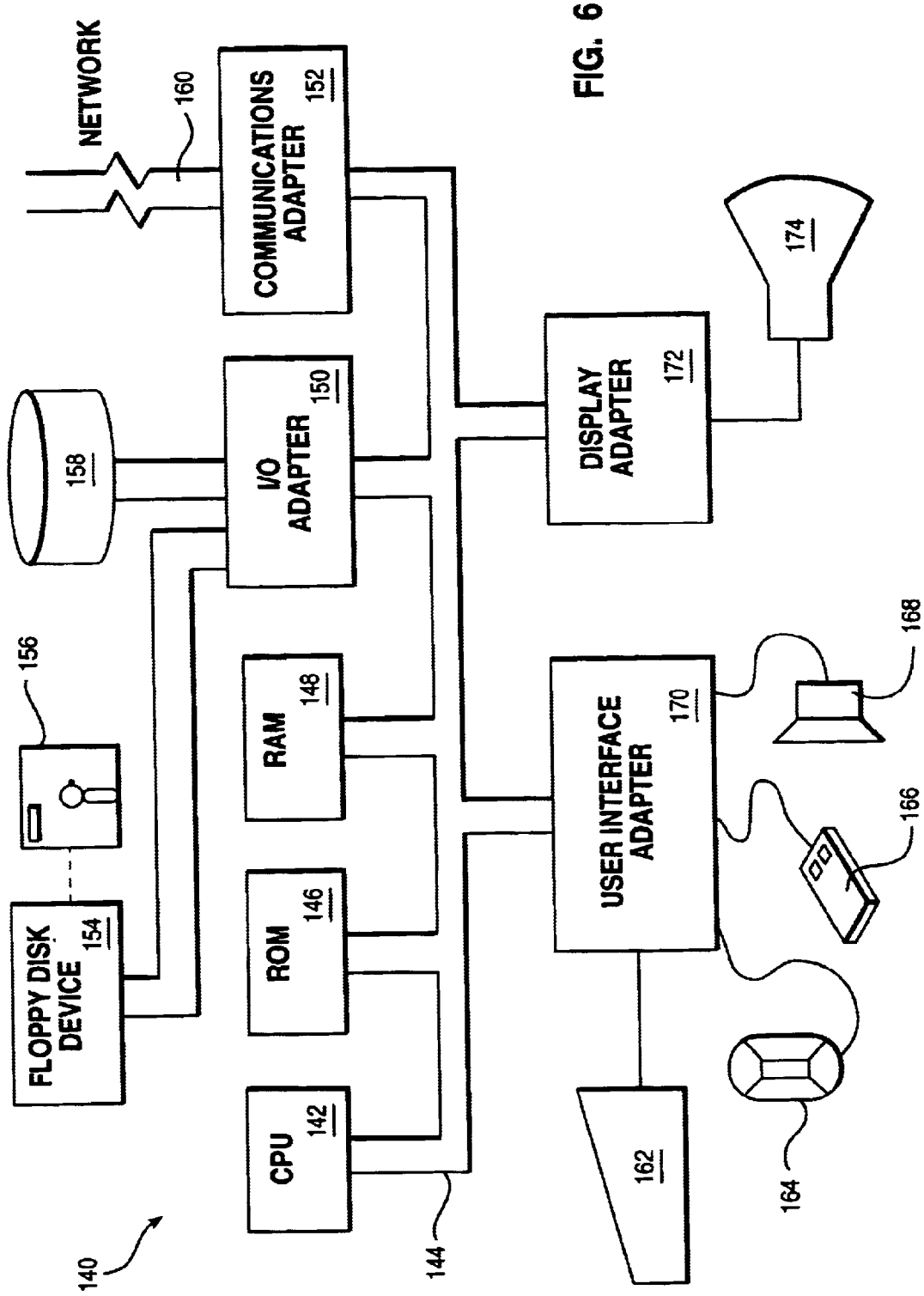
FIG. 6 is a workstation pictorial where the invention may be practiced.

Referring now to FIG. 6, there is shown a workstation/computer system 140 where the invention may be practiced. The workstation 140, contains a CPU/microprocessor 142, connected to random access memory (RAM) 148, read only memory (ROM) 146, through a bus 144. The CPU 142, is capable of communicating with a plurality of Input/Output (I/O) devices through I/O adapter 150. Hard disk storage 158, provides permanent storage of data/information for use by the CPU 142. A floppy disk device 154, provides means for inputting data from a computer program product having a computer readable medium such as a floppy diskette 156. One skilled in the art will appreciate that the computer program of this invention may be inputted to the CPU 142, via the floppy diskette 156. A display monitor 174, is provided to allow a user to observe the execution of data on the CPU 142. Data can also be inputted to the CPU 142, through keyboard 162, and microphone 164. Data displayed on monitor 174, can be manipulated using mouse 166. Output from programs operating on CPU 142, may be obtained over speaker 168. The workstation 140 may be connected to a network (not shown), through communication adapter 160. The workstation 140 may be a Risc System/6000 available from the IBM Corporation, or any compatible workstation.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for adding speech capability to an existing application program comprising the steps of:

providing said existing application program having a plurality of object-oriented components including an input component containing interface information that is loaded and dynamically linked at runtime, said object-oriented input component originally created having no speech capability;

creating a speech enabled object-oriented input component for said existing application program by supplying an alternate object-oriented dynamic library that supports the same interface information in said input component;

determining if speech recognition is installed on said computer system while maintaining the input component and the speech enabled object-oriented input component; and replacing said object-oriented input component of said application program with said speech enabled input component at runtime to allow speech operation in said application program.

2. The method of claim 1 wherein the step of creating a speech enabled component further comprises the step of:

providing an interface having input/output controls including menus for said speech enabled component used by said application program.

3. The method of claim 1 wherein the step of creating a speech enabled component further comprises the step of:

receiving input from a speech recognition system by said speech enabled component directed to said input component in said existing application program.

4. The method of claim 1, wherein the step of creating a speech enabled component further comprises the step of:

passing input by said speech enabled component from said application program to a speech recognition system.

5. An apparatus for adding speech capability to an existing application program comprising:

means for providing said existing application program having a plurality of object-oriented components including an input component containing interface information that is loaded and dynamically linked at runtime, said object-oriented input component originally created having no speech capability;

means for creating a speech enabled object-oriented input component for said existing application program by supplying an alternate object-oriented dynamic library that supports the same interface information in said input component;

determining if speech recognition is installed on said computer system while maintaining the input component and said speech enabled object-oriented input component; and means for replacing said object-oriented input component of said application program with said speech enabled input component at runtime to allow speech operation in said application program.

6. The apparatus of claim 5 wherein the means for enabling a speech component further comprises:

means for providing an interface having input/output controls including menus for said speech enabled component used by said application program.

7. The apparatus of claim 5, wherein the means for creating a speech enabled component further comprises:

means for receiving input from a speech recognition system by said speech enabled component directed to said input component in said existing application program.

8. The apparatus of claim 5 wherein the means for creating a speech enabled component further comprises:

means for passing input by said speech enabled component from said application program to a speech recognition system.

9. A computer program product having a computer readable medium having computer program logic recorded thereon for adding speech capability to an existing application program comprising:

computer readable means for providing said existing application program having a plurality of object-oriented components including an input component containing interface information that is loaded and dynamically linked at runtime, said input component originally created having no speech capability;

computer readable means for creating a speech enabled object-oriented input component for said existing application program by supplying an alternate object-oriented dynamic library that supports the same interface information in said input component;

determining if speech recognition is installed on said computer system while maintaining the input component and said speech enabled object-oriented input component; and computer readable means for replacing said object-oriented input component of said application program with said speech enabled input component at runtime to allow speech operation in said application program.

10. The computer program of claim 9 wherein the computer readable means for enabling a speech component further comprises:

computer readable means for providing an interface having input/output controls including menus for said speech enabled component used by said application program.

11. The computer program of claim 9, wherein the computer readable means for enabling a speech component further comprises:

computer readable means for receiving input from a speech recognition system by said speech enabled component directed to said input component in said existing application program.

12. The computer program of claim 9 wherein the computer readable means for creating a speech enabled component further comprises:

computer readable means for passing input by said speech enabled component from said application program to a speech recognition system.

* * * * *